United States Patent
Boucard et al.

(10) Patent No.: US 10,253,180 B2
(45) Date of Patent: Apr. 9, 2019

(54) THERMOPLASTIC POLYURETHANE SILICONE ELASTOMERS

(71) Applicant: Multibase SA, St. Laurent du Pont (FR)

(72) Inventors: Sylvain Boucard, Pont de Beauvoisin (FR); Yann Gradelet, St. Beron (FR)

(73) Assignee: Multibase SA, St. Laurent du Pont (FR)

( * ) Notice: Subject to any disclaimer, the term of this patent is extended or adjusted under 35 U.S.C. 154(b) by 79 days.

(21) Appl. No.: 15/503,229

(22) PCT Filed: Aug. 11, 2015

(86) PCT No.: PCT/EP2015/068489
§ 371 (c)(1),
(2) Date: Feb. 10, 2017

(87) PCT Pub. No.: WO2016/023914
PCT Pub. Date: Feb. 18, 2016

(65) Prior Publication Data
US 2017/0233572 A1    Aug. 17, 2017

(30) Foreign Application Priority Data

Aug. 12, 2014 (EP) .................................... 14306269

(51) Int. Cl.
| C08L 75/04 | (2006.01) |
| C08G 77/12 | (2006.01) |
| C08G 77/20 | (2006.01) |
| C08K 3/04  | (2006.01) |
| C08K 3/36  | (2006.01) |
| C08L 9/06  | (2006.01) |
| C08L 33/00 | (2006.01) |
| C08L 25/08 | (2006.01) |
| C08L 83/00 | (2006.01) |

(52) U.S. Cl.
CPC .............. *C08L 75/04* (2013.01); *C08G 77/12* (2013.01); *C08G 77/20* (2013.01); *C08K 3/04* (2013.01); *C08K 3/36* (2013.01); *C08L 9/06* (2013.01); *C08L 25/08* (2013.01); *C08L 33/00* (2013.01); *C08L 83/00* (2013.01); *C08L 2207/04* (2013.01)

(58) Field of Classification Search
CPC ........ C08L 75/04; C08L 2207/04; C08L 9/06; C08L 25/08; C08L 33/00; C08L 83/00; C08G 77/12; C08G 77/20; C08K 3/04; C08K 3/36

USPC ......................................................... 524/500
See application file for complete search history.

(56) References Cited

U.S. PATENT DOCUMENTS

| 6,013,715 A * | 1/2000 | Gornowicz ............. C08L 23/02 |
| | | 524/492 |
| 6,153,691 A | 11/2000 | Gornowicz et al. |
| 6,569,955 B1 * | 5/2003 | Brewer ................ C08G 77/455 |
| | | 524/751 |
| 6,759,487 B2 | 7/2004 | Gornowicz et al. |
| 2003/0109623 A1 * | 6/2003 | Gornowicz .......... C08G 77/458 |
| | | 524/492 |
| 2011/0281984 A1 | 11/2011 | Garois et al. |
| 2012/0121876 A1 * | 5/2012 | Milesi ................... C08L 53/025 |
| | | 428/220 |

FOREIGN PATENT DOCUMENTS

| EP | 2380933 A1 | 10/2011 |
| JP | H03502469 A | 6/1991 |
| JP | H06507428 A | 8/1994 |
| WO | WO9006958 A1 | 6/1990 |
| WO | WO03035757 A1 | 5/2003 |
| WO | WO03035759 A1 | 5/2003 |

OTHER PUBLICATIONS

English language abstract and machine translation for JPH06507428 (A) extracted from http://worldwide.espacenet.com database on Feb. 13, 2018, 4 pages.
PCT/EP2015/068489 International Search Report dated Dec. 4, 2015, 3 pages.

* cited by examiner

*Primary Examiner* — Michael Bernshteyn
(74) *Attorney, Agent, or Firm* — Warner Norcross & Judd LLP

(57) ABSTRACT

The invention relates to thermoplastic elastomer compositions comprising a blend of a thermoplastic urethane polymer and a silicone composition, and to a process for forming a vulcanized thermoplastic elastomer composition. The thermoplastic elastomer composition comprises a blend of a thermoplastic organic polymer comprising a urethane polymer and (B) a silicone composition comprising (B1) a silicone base comprising (B1a) a diorganopolysiloxane gum having an average of at least 2 alkenyl groups per molecule and (B1b) from 1 to 50% by weight based on the diorganopolysiloxane gum (B1a) of a reinforcing filler, and (B2) an organohydrido silicone compound which contains an average of at least 2 silicon-bonded hydrogen groups per molecule, wherein the weight ratio of the thermoplastic organic polymer (A) to the silicone composition (B) is in the range 55:45 to 80:20.

9 Claims, No Drawings

THERMOPLASTIC POLYURETHANE SILICONE ELASTOMERS

CROSS-REFERENCE TO RELATED APPLICATIONS

This application is the National Stage of International Application No. PCT/EP2015/068489 filed on 11 Aug. 2015, which claims priority to and all advantages of EP Appl. No. 14306269.3 filed on 12 Aug. 2014, the content of which is hereby incorporated by reference.

FIELD OF THE INVENTION

This invention relates to thermoplastic elastomer compositions comprising a blend of a thermoplastic urethane polymer and a silicone composition, and to a process for forming a vulcanised thermoplastic elastomer composition. In one aspect the invention relates to the use of such a thermoplastic elastomer composition to form a wearable item intended to be in contact with the wearer's skin when in use, and to a wearable item formed of the thermoplastic elastomer composition.

In one aspect the invention relates to the use of such a thermoplastic elastomer composition to form functional and aesthetics automotive parts such as gear knobs, seat belt connector, interior mat, airbag protective cover, overmoulded skin for dash board and armrest; to form appliance parts soft-feel grips for hand held devices; to form medical devices, sporting goods and general rubber parts; requiring durable aesthetics, haptic and ergonomic properties along with stability and low staining when exposed to most commonly used chemicals, and high mechanical performances, abrasion and scratch resistance.

The thermoplastic elastomer composition according to the invention may be used to fabricate parts or components for automotive, appliances, electronics, portable electronic, electrical, communication, and medical applications, where sufficient feel and touch, scratch and mar resistance, chemical resistance and resistance to staining, mechanical performances may be desired, simultaneously.

Silanes and siloxanes are compounds containing silicon.

A silane is a compound derived from $SiH_4$. A silane often contains at least one Si—C bond. A silane usually contains only one Si atom.

A siloxane is a compound which contains at least one Si—O bond.

A polysiloxane contains several Si—O—Si— bonds forming a polymeric chain, where the repeating unit is —(Si—O)—. An organopolysiloxane is sometimes called a silicone. An organopolysiloxane contains repeating —(Si—O)— units where at least one Si atom bears at least one organic group. "Organic" means containing at least one carbon atom. An organic group is a chemical group comprising at least one carbon atom.

A polysiloxane comprises terminal groups and pendant groups. A terminal group is a chemical group located on a Si atom which is at an end of the polymer chain. A pendant group is a group located on a Si atom which Si atom is not at the end of the polymeric chain.

A polymer is a compound containing repeating units which units typically form at least one polymeric chain. A polymer can be a homopolymer of a copolymer. A homopolymer is a polymer which is formed from only one type of monomer. A copolymer is a polymer formed from at least two monomers. A polymer is called an organic polymer when the repeating units contain carbon atoms.

Some polymers are thermoset: once cooled and hardened, these polymers retain their shapes and cannot return to their original form. Other polymers are thermoplastics: they can soften upon heating and return to their original form.

A cross linking reaction is a reaction where two or more molecules, at least one of them being a polymer, are joined together to harden or cure the polymer. A cross linker is a compound able to produce a crosslinking reaction of a polymer.

A gum is a usually made of a polymer of high molecular weight. A gum takes the form of a fluid having a high viscosity. A gum has typically a viscosity of at least 100 mPa·s at 25° C. A gum can have a viscosity of up to 2000 000 mPas at 25° C. or even more.

Urethane link is —NH—(C=O)—O— link. A urethane polymer is also called polyurethane.

An elastomer, sometimes called a rubber, is a polymer having both viscosity and elasticity. Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition or melting point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend (physical blend) can be obtained by uniformly mixing an elastomeric component with a thermoplastic resin. When the elastomeric component is also cross-linked during mixing, a thermoplastic elastomer known in the art as a thermoplastic vulcanizate (TPV) results. Since the cross-linked elastomeric phase of a TPV is insoluble and non-flowable at elevated temperature, TPVs generally exhibit improved oil and solvent resistance as well as reduced compression set relative to the simple blends.

BACKGROUND OF THE INVENTION

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV).

U.S. Pat. No. 6,759,487 describes a re-processable thermoplastic composition comprising a thermoplastic polyurethane polymer and a silicone elastomer in weight ratio 95:5 to 15:85. The silicone elastomer is the reaction product of dynamic vulcanisation of a diorganopolysiloxane gum, a reinforcing filler, an organohydrido silicon compound and a hydrosilation catalyst. We have found that such limits do not permit to achieve a thermoplastic elastomer composition able to form a wearable item intended to be in contact with the wearer's skin when in use. As a consequence, the present invention describes a narrower range of formulation (A) over (B) able to provide superior scratch, abrasion resistance and chemical resistance. Moreover, the present invention highlight needs of specific selection of base polymer (A).

U.S. Pat. No. 6,153,691 describes preparing a thermoplastic elastomer by mixing a thermoplastic resin, a silanol-terminated diorganopolysiloxane, an organohydrido silicon compound and a condensation catalyst, and dynamically curing the diorganopolysiloxane. EP 2380 933 describes preparing a thermoplastic elastomer by side injection of 2 parts liquid silicone pre-polymer, one part comprising a catalyst and the other part SiH crosslinker to achieve silicone cure. Preparation method described in the present invention is based on use of a 3 separate silicone products: a silicone base (B1), an organohydrido silicone (B2) and a hydrosilylation catalyst (C).

We have found according to the invention that certain thermoplastic compositions comprising a thermoplastic urethane polymer and a silicone elastomer, having particular ratios of silicone to urethane polymer and of reinforcing filler to silicone, have a desirable soft touch feel to skin, and good scratch resistance and chemical resistance when used in prolonged contact with human skin.

BRIEF SUMMARY OF THE INVENTION

A thermoplastic elastomer composition according to the invention comprises a blend of (A) a thermoplastic organic polymer comprising a urethane polymer and (B) a silicone composition comprising: (B1) a silicone base comprising: (B1a) a diorganopolysiloxane gum having an average of at least 2 alkenyl groups per molecule and (B1b) from 1 to 50% by weight based on the diorganopolysiloxane gum (B1a) of a reinforcing filler, and (B2) an organohydrido silicone compound which contains an average of at least 2 silicon-bonded hydrogen groups per molecule and (C) a hydrosilylation catalyst, wherein the weight ratio of the thermoplastic organic polymer (A) to the silicone composition (B) is in the range 55:45 to 80:20.

A wearable item according to the invention, such as a bracelet or a support pad for sunglasses, reading glasses or wearable electronics, is formed of the thermoplastic elastomer composition described above.

The invention includes the use of the thermoplastic elastomer composition described above to form a wearable item intended to be in contact with the wearer's skin when in use.

A process according to the invention for forming a vulcanised thermoplastic elastomer comprises contacting (A) a thermoplastic urethane polymer, (B1) a silicone base comprising: (B1a) a diorganopolysiloxane gum having an average of at least 2 alkenyl groups per molecule and (B1b) from 1 to 50% by weight based on the diorganopolysiloxane gum (B1a) of a reinforcing filler, (B2) an organohydrido silicone compound which contains an average of at least 2 silicon-bonded hydrogen groups per molecule and (C) a hydrosilylation catalyst, the weight ratio of the thermoplastic urethane polymer (A) to the total weight of the silicone base (B1) and the organohydrido silicone compound (B2) is in the range 55:45 to 80:20.

DETAILED DESCRIPTION

A thermoplastic urethane polymer can be the only thermoplastic organic polymer (A) present. By an organic polymer we mean a polymer in which at least 50% of the atoms in the polymer chain are carbon atoms. The thermoplastic organic polymer (A) can alternatively comprise 50-100% by weight thermoplastic urethane polymer and 0-50 wt. % of another thermoplastic organic polymer, which may be a thermoplastic elastomer.

The thermoplastic urethane polymer is generally a polyurethane formed from a polyisocyanate and a polyol. The polyisocyanate is typically a diisocyanate and can be aromatic, for example toluene diisocyanate, methylene diphenyl diisocyanate, p-phenylene diisocyanate or 1,5-naphthylene diisocyanate, or aliphatic, for example isophorone diisocyanate, hexamethylene diisocyanate or 4,4'-methylenebis(cyclohexyl diisocyanate), or can be an aryl compound containing aliphatic isocyanate groups such as 1,3-bis(1-isocyanato-1-methylethyl) benzene. Mixtures of polyisocyanates can be used, for example a mixture of aromatic and aliphatic diisocyanates.

The polyol is typically a diol and can be a polymeric diol such as polypropylene glycol, polytetramethylene glycol, polyadipate, polycaprolactone or polycarbonate diol, or a diol compound such as butane-1,4-diol, hydroquinone, propane-1,3-diol, isosorbide or ethylhexanediol. Mixtures of polyols can be used, for example a mixture of a polymeric diol and a low molecular weight diol. The thermoplastic urethane polymer (A) can be formed from a polyisocyanate, a polyol and a compound polymerisable to a polymeric diol in the presence of a low molecular weight diol, for example a lactone such as caprolactone (2-oxepanone).

The urethane polymer can contain urea linkages in addition to urethane linkages. Such a urethane polymer can be formed by reacting a polyisocyanate with a mixture of a polyol and a polyamine.

Examples of commercially available polyurethanes suitable as thermoplastic urethane polymer (A) include thermoplastic polyurethanes formed from methylenediphenyl diisocyanate, 1,4-butanediol and 2-oxepanone sold by Dow Chemical Company under the trademarks 'Pellethane 2102-75A' and 'Pellethane 2102-80A', thermoplastic polyurethane formed from methylenediphenyl diisocyanate, 1,4-butanediol and polybutylene adipate sold by Dow Chemical Company under the trademarks 'Pellethane 2355-75A', thermoplastic polyurethanes formed from methylenediphenyl diisocyanate, 1,4-butanediol and polytetramethylene glycol sold by Dow Chemical Company under the trademarks 'Pellethane 2103-70A' and 'Pellethane 2103-80AE', polycaprolactone copolyester based thermoplastic polyurethanes sold by Lubrizol-Merquinsa under the trademarks 'Pearlthane 11T80', 'Pearlthane 11T85' and 'Pearlthane 11T98', 'Pearlthane 91T85', 'Pearlthane 91T86', where "Pearlthane 11" and "Pearlthane 91" series respectively correspond to aromatic based diisocyanate and aliphatic based diisocyanate products range, aromatic polyester-based polyurethanes sold by BASF under the trademarks 'Elastollan C78A15', 'Elastollan S80A15', 'Elastollan 688A10N', 'Elastollan B80A11', 'ELASTOLLAN C 75 A 15 HPM' and aliphatic polyester based polyurethanes sold by BASF under the trade mark 'Elastollan®LP 9277' or by Bayer under the trade mark 'DESMOPAN W83085A', polyether-based polyurethanes sold by BASF for example under the trade mark 'Elastollan 1100' and 'ELASTOLLAN 1180A', and aromatic polyether-based thermoplastic polyurethanes sold by Bayer under the trademarks 'Texin 985', 'Texin 990R' and 'Texin DP7-1165', and aromatic polyether-based thermoplastic polyurethane sold by Bayer under the trade mark 'Desmopan 385' and polyester-ether polyurethanes sold by Bayer under the trade mark 'DESMOPAN 588 A' for aromatic diisocyanate category or 'DESMOPAN W85092A' and 'DESMOPAN W85085A' for aliphatic diisocyanate category respectively and polycarbonate-ether polyurethanes sold by Bayer under the trade mark 'Desmopan DP 87040D'.

The thermoplastic urethane polymer (A) can be unplasticised but a plasticised thermoplastic polyurethane can be used, for example those sold by BASF under the trademarks 'Elastollan C60A10W' and 'Elastollan C70A10W', which contain up to 35% plasticiser and up to 25% plasticiser respectively.

If the thermoplastic organic polymer (A) comprises a mixture of a thermoplastic urethane polymer and another thermoplastic organic polymer, that other thermoplastic organic polymer can for example be a styrene-based non-crosslinked elastomer. The styrene-based non-crosslinked elastomer can for example be a styrene isoprene copolymer, a styrene butylene copolymer, a styrene ethylene propylene terpolymer or a styrene butylene ethylene terpolymer. Such a styrene-based non-crosslinked elastomer can form up to 50% by weight of the thermoplastic organic polymer (A). The other thermoplastic organic polymer can additionally or alternatively comprise an acrylic styrene copolymer, that is a copolymer of styrene with at least one acrylic monomer such as an acrylate or methacrylate ester or acrylonitrile. The acrylic styrene copolymer can for example be an acrylonitrile-butyl acrylate-methyl methacrylate-styrene copolymer. Such an acrylic styrene copolymer can for example form up to 50% by weight of the thermoplastic organic polymer (A). The thermoplastic organic polymer (A) can thus for example comprise 50 to 100% by weight thermoplastic polyurethane, 0 to 50% by weight of a styrene-based non-crosslinked elastomer, and 0 to 20% of an acrylic styrene copolymer.

The alkenyl groups of the diorganopolysiloxane gum (B1a) can be exemplified by vinyl, hexenyl, allyl, butenyl, pentenyl, and heptenyl groups. Silicon-bonded organic groups in organopolysiloxane (A) other than alkenyl groups may be exemplified by methyl, ethyl, propyl, butyl, pentyl, hexyl, or similar alkyl groups; or phenyl, tolyl, xylyl, or similar aryl groups.

The organopolysiloxane gum (B1a) may have a predominantly linear molecular structure. The organopolysiloxane gum (B1a) can for example comprise an α,ω-vinyldimethylsiloxy polydimethylsiloxane, an α,ω-vinyldimethylsiloxy copolymer of methylvinylsiloxane and dimethylsiloxane units, and/or an α,ω-trimethylsiloxy copolymer of methylvinylsiloxane and dimethylsiloxane units. The organopolysiloxane gum (B1a) usually has a viscosity of at least 100 mPa·s at 25° C., for example at least 300 mPa·s, and may have a viscosity of up to 90000 mPa·s, for example up to 70000 mPa·s. The organopolysiloxane gum (B1a) can if desired be modified with a small amount of an unreactive silicone such as a trimethylsilyl-terminated polydimethylsiloxane.

The organopolysiloxane (B2) having at least two Si-bonded hydrogen atoms per molecule can for example be a low molecular weight organosilicon resin or a short or long chain organosiloxane polymer, which may be linear or cyclic. The organopolysiloxane (B2) preferably has at least 3 silicon-bonded hydrogens per molecule which are capable of reacting with the alkenyl or other aliphatically unsaturated groups of the polyorganosiloxane gum (B1a). The organopolysiloxane (B2) may for example have the general formula

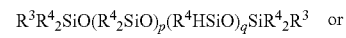

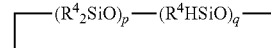

wherein $R^4$ denotes an alkyl or aryl group having up to 10 carbon atoms, and $R^3$ denotes a group $R^4$ or a hydrogen atom, p has a value of from 0 to 20, and q has a value of from 1 to 70, and there are at least 2 or 3 silicon-bonded hydrogen atoms present per molecule. $R^4$ can for example be a lower alkyl group having 1 to 3 carbon atoms, such as a methyl group. The organopolysiloxane (B2) can for example have a viscosity of from 1 to 150 mPa·s at 25° C., alternatively 2 to 100 mPa·s or 5 to 60 mPa·s at 25° C. The average degree of polymerisation of the organopolysiloxane (B2) can for example be in the range 30 to 400 siloxane units per molecule. Examples of suitable organopolysiloxanes (B2) include trimethylsiloxane end-blocked polymethylhydrosiloxanes, dimethylhydrosiloxane end-blocked methylhydro siloxane, dimethylsiloxane methylhydrosiloxane copolymers and tetramethylcyclotetrasiloxane. The organopolysiloxane (B2) may comprise a mixture of more than one of these materials.

The molar ratio of Si—H groups in the organopolysiloxane (B2) to aliphatically unsaturated groups in the organopolysiloxane gum (B1a) is preferably at least 1:1 and can be up to 8:1 or 10:1. For example the molar ratio of Si—H groups to aliphatically unsaturated groups is in the range from 1.5:1 to 5:1.

The reinforcing filler (B1b) can for example be silica. The silica can for example be fumed (pyrogenic) silica, such as that sold by Cabot under the trade mark Cab-O-Sil MS-75D, or can be precipitated silica. The particle size of the silica is for example in the range 0.5 μm to 20 μm, alternatively 1 μm to 10 μm. The silica can be treated silica produced for example by treating silica with a silane or with a polysiloxane. The silane or polysiloxane used to treat the silica usually contains hydrophilic groups which bond to the silica surface and aliphatically unsaturated hydrocarbon or hydrocarbonoxy groups and/or Si-bonded hydrogen atoms.

The silica can for example be treated with an alkoxysilane, for example a silane comprising at least one Si-bonded alkoxy group and at least one Si-bonded alkenyl group or at least one Si-bonded hydrogen atom. The alkoxysilane can be a monoalkoxysilane, a dialkoxysilane or a trialkoxysilane containing at least one aliphatically unsaturated hydrocarbon group such as a vinylalkoxysilane, for example vinyltrimethoxysilane, vinyltriethoxysilane or vinylmethyldimethoxysilane. The Si-bonded alkoxy groups are readily hydrolysable to silanol groups which bond to the silica surface.

The silica can alternatively be treated with a polysiloxane, for example an oligomeric organopolysiloxane, containing Si-bonded alkenyl groups and silanol end groups.

The silica can for example be treated with 2% to 60% by weight based on the silica of an alkoxysilane containing alkenyl groups or an oligomeric organopolysiloxane containing alkenyl groups.

The hydrosilylation catalyst (C) is preferably a platinum group metal (Group VIII of the Periodic Table) or a compound thereof. Platinum and/or platinum compounds are preferred, for example finely powdered platinum; a chloroplatinic acid or an alcohol solution of a chloroplatinic acid; an olefin complex of a chloroplatinic acid; a complex of a chloroplatinic acid and an alkenylsiloxane; a platinumdiketone complex; metallic platinum on silica, alumina, carbon or a similar carrier; or a thermoplastic resin powder that contains a platinum compound. Catalysts based on other platinum group metals can be exemplified by rhodium, ruthenium, iridium, or palladium compounds. For example, these catalysts can be represented by the following formulas: $RhCl(PPh_3)_3$, $RhCl(CO)(PPh_3)_2$, $Ru_3(CO)_{12}$, $IrCl(CO)(PPh_3)_2$, and $Pd(PPh_3)_4$ (where Ph stands for a phenyl group).

The catalyst (C) is preferably used in an amount of 0.5 to 100 parts per million by weight platinum group metal based on the polyorganosiloxane (B), more preferably 1 to 50 parts per million. The hydrosilylation catalyst (C) catalyses the reaction of the alkenyl groups of organopolysiloxane gum (B1a) with the Si—H groups of organopolysiloxane (B2).

The thermoplastic elastomer is produced by contacting the thermoplastic organic polymer (A) comprising a urethane polymer with (B1) a silicone base comprising (B1a) the diorganopolysiloxane gum having an average of at least 2 alkenyl groups per molecule and (B1b) the reinforcing filler, (B2) the organohydrido silicone compound containing an average of at least 2 silicon-bonded hydrogen groups per molecule and (C) the hydrosilylation catalyst. The thermoplastic organic polymer (A), the silicone base (B1), the organohydrido silicone compound (B2) and the hydrosilylation catalyst (C) are generally contacted at elevated temperature, for example a temperature in the range 100° C. to 250° C. A temperature in the range 160° C. to 240° C., alternatively 180° C. to 220° C., can conveniently be used. Reaction of the alkenyl groups of organopolysiloxane gum (B1a) with the Si—H groups of organopolysiloxane (B2) proceeds simultaneously with mixing of the silicone composition (B) with the thermoplastic organic polymer (A), producing a vulcanised thermoplastic elastomer composition.

The thermoplastic organic polymer (A), the silicone base (B1), the organohydrido silicone compound (B2) and the hydrosilylation catalyst (C) are mixed in any device capable of dispersing the silicone components uniformly in the thermoplastic polyurethane polymer. The thermoplastic organic polymer (A), the silicone base (B1), the organohydrido silicone compound (B2) and the hydrosilylation catalyst (C) can for example be blended in an extruder. The extruder can be a uniaxial extruder, a biaxial extruder, or a multiaxial extruder. A twin screw extruder, particularly one having a length/diameter (L/D) ratio over 40, is generally suitable. The screw speed can for example be 150 to 300 rpm. The residence time of the thermoplastic organic polymer (A) and silicone base (B1) in an extruder can for example be 30 to 240 seconds.

The silicone base can be prepared by premixing the diorganopolysiloxane gum (B1a) and the reinforcing filler (B1b) before feeding the silicone base (B1) to the extruder or other mixing device, or the diorganopolysiloxane gum (B1a) and the reinforcing filler (B1b) can be fed separately to the mixing device. The silicone base (B1) can be mixed with the thermoplastic organic polymer (A) in the initial processing section of the extruder. The thermoplastic organic polymer (A) can for example be introduced into the main feed of a co-rotative twin screw extruder operating at a temperature high enough to melt the thermoplastic organic polymer. The silicone base (B1) can be added into the already melted olefin polymer phase using for example a gear pump. To maintain the quality of working surroundings and avoid side reactions, inert gas flushing or deaeration using a single stage venting or multi-stage venting can be used.

The organohydrido silicone compound (B2) and the hydrosilylation catalyst (C) can be added in subsequent sections of the extruder. Dynamical cure or vulcanizing of diorganopolysilxane is conducted during the mixing stage, typically within the extruder, when both the organohydrido silicone compound (B2) and the hydrosilylation catalyst (C) have been added to the composition. The order of addition of the organohydrido silicone compound (B2) and the hydrosilylation catalyst (C) is not critical. However whichever of these components is added first should be well dispersed in thermoplastic polyurethane polymer before the other component is added to initiate dynamic vulcanization. For example the organohydrido silicone compound (B2) can be added to the composition after the thermoplastic organic polymer (A) and the silicone base (B1) have been mixed, and the hydrosilylation catalyst (C) can be added subsequently to initiate dynamic vulcanization while continuing mixing. The organohydrido silicone compound (B2) could alternatively be added to the composition with the silicone base (B1). In a further alternative, the hydrosilylation catalyst (C) can be added to the composition after the thermoplastic organic polymer (A) and the silicone base (B1) have been mixed, and the organohydrido silicone compound (B2) can be added subsequently to initiate dynamic vulcanization while continuing mixing.

Alternative plastic mixing equipment can be used, for example a batch internal mixer such as a Z-blades mixer or a Banbury mixer. The components can be mixed in the order described above, allowing sufficient mixing time for the silicone base (B1) and organohydrido silicone compound (B2) to be well dispersed in thermoplastic polyurethane polymer before the hydrosilylation catalyst is added to initiate dynamic vulcanization.

Other additional components may be present in the thermoplastic elastomer compositions of the invention to obtain a desired processing or performance property for the thermoplastic elastomer. Such additional components may for example include softening mineral oils, plasticisers, other mineral fillers, pigments, dyes, viscosity modifiers, stabilisers, lubricants and/or flexibilisers.

Mineral oils are generally petroleum distillates in the $C_{15}$ to $C_{40}$ range, for example white oil, liquid paraffin or a naphthenic oil. If used, the mineral oil can for example be premixed with the thermoplastic organic polymer (A). The mineral oil can for example be present at 0.5 to 20% by weight based on the thermoplastic organic polymer (A).

Plasticizers can be present in combination with or alternatively to mineral oils. Examples of suitable plasticisers include phosphate ester plasticisers such as friaryl phosphate isopropylated, resorcinal bis-(diphenyl phosphate) or phosphate ester sold by Great Lakes Chemical Corporation under the trade mark Reofos® RDP. Such plasticizers can for example be used in a range from 0.5 up to 15%. Phosphate esters have dual functionality as plasticizing agent and flame retardant in polyurethane.

Examples of other mineral fillers include talc or calcium carbonate. Fillers may be treated to make their surface hydrophobic. Such fillers, if present, are preferably present at a lower level than the reinforcing filler (B1b) such as silica. Fillers may be premixed either with the thermoplastic organic polymer (A) or the silicone base (B1).

Examples of pigments include carbon black and titanium dioxide. Pigments can for example be premixed with the thermoplastic organic polymer (A).

A stabiliser can for example be an antioxidant, for example a hindered phenol antioxidant such as tetrakis (methylene(3,5-di-tert-butyl-4-hydroxy-hydrocinnamate)

methane sold by BASF under the trade mark 'Irganox 1010'. Such an antioxidant can for example be used at 0.05 to 0.5% by weight of the thermoplastic elastomer composition.

A lubricant can for example be a surface lubricating additive to improve the processability of the thermoplastic elastomer in moulding operations. An example of a surface lubricating additive is Ethylbutylstearamide sold by CRODA under the trade mark 'Crodamide-EBS'. A lubricant can for example be used at 0.1 to 2% by weight of the thermoplastic elastomer composition.

The thermoplastic elastomer compositions of this invention have a desirable soft touch feel to skin and high mechanical performance, good scratch resistance and chemical resistance (stability to most commonly used chemicals). These attributes of soft touch feel to skin, good scratch resistance and chemical resistance and high mechanical performance are retained when the thermoplastic elastomer is used in conditions such as prolonged contact with human skin. The silicone, being a breathable material, allows the thermoplastic elastomer to be permeable to gas and water vapor but hydrophobic enough to limit water condensing inside the composition. As the silicone phase is cross-linked (vulcanised) during the mixing phase and is uniformly micro dispersed into the polyurethane matrix, the thermoplastic elastomer composition has substantial chemical resistance and reduced water pick-up, thus protecting the polyurethane matrix against potential hydrolysis and has high mechanical performance, scratch resistance, mechanical abrasion resistance and resistance to wear resulting in an overall improved durability.

The thermoplastic elastomer compositions of this invention can be shaped by any of the processes typically used for thermoplastic materials, for example compression moulding, injection moulding or extrusion. In one embodiment, the thermoplastic elastomer can be bonded, moulded, overmoulded or co-extruded to substrates, such as other thermoplastics, glass or metal without compromising the above attributes.

The thermoplastic elastomer compositions of this invention are suitable for use wherever a soft feel or touch and chemical resistance and scratch resistance are desired simultaneously. The thermoplastic elastomers can for example be used for fabricating parts or components for automotive, electronics, portable electronic, electrical, communication, appliances and medical applications. For example they may be used to produce ducts and cable insulation, automotive, electronics and appliances components such as belts, bracelets, soft temple tips, protective covers and wearable electronics; hoses, boots, bellows, gaskets, soft-feel covers, keyboards' palm rest, parts and protective covers of laptops and tablet computing devices, automotive parts: airbag cover skin, steering wheel skin, gear knobs, grip handle, arm rest, interior skin, car mats (such as cup holder, bin, glove box mat), small knobs, switches, and large automotive parts (large meaning of surface greater than 20 cm$^2$) such as glove box panel, dashboard, door panel, etc. Due to its intrinsic elastomeric properties, it can also be used for weather insulation, such as mirror seal, interior and exterior seal.

Other applications are: protective covers; liquid line component and air ducts; architectural seals; bottle closures; furniture components; resistant and soft-feel grips for hand held devices; packaging components such as seals, bottles, cans, cups; medical and hygiene devices; cookware parts and accessories; sporting and leisure goods such as rackets, bike parts; footwear soles, toys, and general rubber parts; medical devices; sporting goods and general rubber parts.

The thermoplastic elastomer compositions of this invention have particular advantage when used to form wearable items such as watch bracelets, GPS bracelets, temple tips and nose pads for sun and reading glasses Such wearable items retain their attributes over prolonged contact with human skin and various cosmetic chemicals on the skin such as fragrances, moisturizers and creams, and skin exudates such as sweat. For example, one will need to tie a thermoplastic elastomer bracelet close enough to the arm that the bracelet cannot move up and down following the user's arm movement, thus any cosmetics or sweats will come into contact with the plastic. In many of these applications, for example for ear bugs and soft temple tips for sunglasses, the thermoplastic elastomer is overmoulded onto a hard substrate to provide a soft touch surface with excellent grip. Bracelets such as watch bracelets are usually not overmoulded; in this application the thermoplastic elastomer has to be soft enough to still provide excellent soft touch yet be hard enough to withstand contact with harder objects that can be nearby; for example one might wear the thermoplastic bracelet alongside a metallic bracelet on same arm.

The thermoplastic elastomer composition of this invention has a desirable soft touch feel to skin, good scratch resistance and chemical resistance (stability to most commonly used chemicals). These attributes are retained when the thermoplastic elastomer is extruded, co-extruded, extruded-laminate, calendaring, extruded-calendaring or laminate to form a thermoplastic film, thermoplastic sheet and synthetic leather, with grain or none grain surfaces. The thermoplastic elastomer composition of this invention can be applied on textile creating a laminate forming a synthetic leather product. Co-extrusion or post processing with a compatible material, thermoplastic, synthetic woven or non-woven textile can be achieved to form a complex laminate. Co-extrusion or post processing with a non-compatible material thermoplastic, synthetic or natural woven or non-woven textile, to form a complex laminate can be achieved using adequate primer or interfacial material.

Examples of applications are:
synthetic leather for automotive application uses such as seat, door panel cover, gear knob, arm rests, steering wheels, wheels cover
synthetic leather for appliance on electronic application such as electronic devices such as laptops or tablets providing soft touch feeling
synthetic leather for sporting goods and footwear applications
watch bands or straps for fitness tracking devices
2 K parts based on overmoulded, coextruded, or back sheet moulded part with the thermoplastic elastomer composition of this invention and compatible material
2 K parts based on overmoulded, coextruded, or back sheet moulded part with the thermoplastic elastomer composition of this invention and non-compatible material+use of adequate adhesion promoter or technique to bond these.

The thermoplastic elastomer compositions of this invention also have particular advantages when used to form large electronic parts and accessories, particularly of portable electronic devices, such as keyboards' palm rest, or parts and protective covers of laptops and tablet computing devices. The thermoplastic elastomer compositions of the invention combine high mechanical performance, scratch resistance and improved durability with a desirable soft touch.

The weight ratio (A):(B) of 2 components is always a respective amount of (A) and (B) with a total amount of (A)+(B) of 100.

The weight ratio of the thermoplastic organic polymer (A) to the silicone composition (B) is generally in the range 55:45 to 80:20. Within this range, the level of silica in the silicone composition (B), the weight ratio of the thermoplastic organic polymer (A) to the silicone composition (B) and the cross-linking density of the silicone can be varied to give the desired balance of soft touch feel, mechanical performance, moisture resistance, chemical resistance against cosmetics and scratch resistance. The cross-linking density of the silicone can be varied by varying the diorganopolysiloxane gum (B1a) used, in particular with respect to the siloxane chain length between alkenyl groups. A long chain diorganopolysiloxane gum (B1a) having only two terminal alkenyl groups will form a softer thermoplastic elastomer; a diorganopolysiloxane gum (B1a) having more alkenyl groups or a shorter chain length will form a harder thermoplastic elastomer.

The thermoplastic elastomers used to form wearable items are preferably of low hardness, for example of Shore A hardness below 80, for example a Shore A hardness in the range 65 to 80. Such low hardness thermoplastic elastomers can for example have a weight ratio of the thermoplastic organic polymer (A) (for example polyurethane) to the silicone composition (B) in the range 55:45 to 65:35, alternatively 55:45 to 60:40. We have found that for thermoplastic elastomers having this weight ratio of thermoplastic organic polymer (A) to silicone composition (B), the optimum combination of soft touch and feel and comfort when worn with high scratch resistance is obtained when the reinforcing filler content is kept low, for example when a silica reinforcing filler (B1b) is present at from 1 or 2% by weight up to 4%, 6% or 10% by weight based on the diorganopolysiloxane gum (B1a).

A harder thermoplastic elastomer, for example a Shore A hardness in the range 75 to 85, can for example have a weight ratio of the thermoplastic organic polymer (A) to the silicone composition (B) is in the range 65:35 to 80:20, alternatively 65:35 to 75:25. We have found that for thermoplastic elastomers having this weight ratio of thermoplastic organic polymer (A) to silicone composition (B), the optimum combination of soft touch with high scratch resistance is obtained when the reinforcing filler, for example silica, is present at from 6 to 20% by weight, for example 6 to 15%, based on the diorganopolysiloxane gum (B1a). Such compositions show a suitable viscosity for moulding large parts or over moulding operations such as protective cover of laptops, tablets and any other portable electronics or appliances. The thermoplastic elastomers form a thin soft skin layer having good scratch resistance.

EXAMPLES

The invention is illustrated by the following examples, in which parts and percentages are by weight unless otherwise stated.

The materials used in the Examples were
Si-Rubber 1: Uncatalysed Silicone Rubber Base comprising a vinyl-terminated diorganopolysilxane gum of 70 Shore A hardness with a silica content of 35%
Si-Rubber 2: Uncatalysed Silicone Rubber comprising a vinyl-terminated diorganopolysilxane gum of 40 Shore A hardness with a silica content of 8%
Si-Fluid is a polydimethylsiloxane fluid
Cat.: Dow corning 'Syl-Off 4000' Platinum Catalyst having a Pt content of 0.40%.
XL: Dimethyl, Methylhydrogen Siloxane, copolymer, Trimethylsiloxy-terminated of Si-bonded hydrogen content 1.6%
TPU1: BASF ELASTOLLAN B 90 A 11 000, thermoplastic polyurethane
TPU2: BASF ELASTOLAN C70A10WH, thermoplastic polyurethane
TPU3: Lubrysol-Merquinsa 'Pearlthane 11T85' thermoplastic polyurethane
AO: BASF Irganox 1010, tetrakis(methylene(3,5-di-tert-butyl-4-hydroxy-hydrociannate)methane
Additive: CRODA Crodamide-EBS, Ethylbutylstearamide surface lubricating additive.
Black-MB: Color concentrate comprising 40% carbon black mixed with thermoplastic polyurethane supplied by Polyone Five thermoplastic elastomers were prepared by the process of the invention. The mixing of components and vulcanisation was carried out using a twin screw extruder, 25 mm of diameter and 48 L/D. The processing section was heated in a range from 180° C. up to 220° C. the screw speed was 200 rpm and the throughput rate was 15 kg/hour. Si-Rubber 1 or 2 was added to organic thermoplastic preblend (TPU) within the two first sections of the extruder. The organohydridopolysiloxane XL is added into the blend to achieve a good dispersion of these two silicone components in the thermoplastic polyurethane before addition of the catalyst, which initiates the vulcanization of the silicone composition within the polyurethane matrix. Feeding zones for each component are fixed and located within the first half of the twin screw extruder barrel. The proportions of materials used are shown in Table 1 below.

Test specimens for mechanical and scratch resistance testing were prepared by injection moulding. Heating temperature for injection moulding was set at 180° C. to 220° C. and mold temperature set at 40° C. The mechanical properties were tested according to international standards as set out in Table 1.

Scratch performance measurement relies on a test protocol specifically developed to characterize scratch resistance of soft elastomeric products corresponding to typical hardness of 40 Shore A to 98 Shore A defined according to ISO 868 standard for elastomer and rubber material. Scratch resistance protocol used relies on a quantitative measurement of the aspect change of a moulded specimen caused by scratch lines. The aspect change is a translation of both chromatic aberration measurement and gloss change before and after scratch is performed onto the specimen. For comparison purpose and to increase testing consistency and robustness a calibrated hardness scratch tester 430 PII supplied by Erichsen has been used. Scratch hardness tester is set to perform a scratch pattern composed of 80 parallel line spaced 0.5 mm apart using a ball shape scratch tip of 0.5 mm of diameter on which a constant loading of 6 N is applied. The results of scratch performance presented in Table 1 are calculations representative of the residual aspect of the surface, after the impact of scratch, compared to the undamaged surface. The higher the value, the higher the scratch resistance. A value above 50% indicates good scratch resistance.

TABLE 1

|  | Comp 1 | Comp. 2 | Comp. 3 | Comp. 4 | Comp. 5 |
|---|---|---|---|---|---|
| Si-Rubber 1 | 43.33 | 38.71 | 24.2 | | |
| Si Rubber 2 | | | | 38.71 | 24.2 |
| Si-Fluid | 0.54 | 0.34 | 0.022 | 0.34 | 0.022 |
| TPU1 | 31 | | | | |
| TPU2 | 19 | | | | |
| TPU3 | | 55.85 | 70.85 | 55.85 | 70.85 |
| XL | 1.27 | 0.9 | 0.56 | 0.9 | 0.56 |
| Cat. | 0.06 | 0.04 | 0.02 | 0.04 | 0.02 |
| AO | 0.15 | 0.15 | 0.15 | 0.15 | 0.15 |
| Additive | 0.65 | | | | |
| Black-MB | 4 | 4 | 4 | 4 | 4 |

|  | Unit | Standard | | | | | |
|---|---|---|---|---|---|---|---|
| Hardness | Shore A | ISO 868 | 70 | 78 | 82 | 70 | 78 |
| Tensile strength at 100% of elongation - transversal-500 mm/min | MPa | ISO 37 | 3.3 | 4.3 | 5.1 | 3.3 | 4.5 |
| Tensile strength at 200% of elongation - transversal-500 mm/min | MPa | ISO 37 | 4.6 | 6.1 | 6.9 | 4.9 | 6.3 |
| Tensile strength at 300% of elongation - transversal-500 mm/min | MPa | ISO 37 | 6.1 | 8.8 | 10.2 | 7.6 | 9.6 |
| Tensile strength at break - transversal-500 mm/min | MPa | ISO 37 | 15.7 | 22 | 34 | 16 | 27 |
| Elongation at break - transversal-500 mm/min | % | ISO 37 | 600 | 500 | 540 | 460 | 490 |
| Tear strength - Transversal-500 mm/min | N/mm | ISO R 34/B/A | 54 | 63 | 83 | 52 | 76 |
| Erichsen scratch test (6N; 0.5 mm ball-shape; 80 × 0.5 lines) | % | Internal | 65 | 70 | 80 | 85 | 75 |

When Si-Rubber 1 containing a relatively high level of silica is used as the silicone base, the results in Table 1 show a significant increase of scratch resistance along with an increase of mechanical properties by lowering the content of silicone rubber base. The highest performance is reached for Composition 3 corresponding to low 25% containing Si-Rubber 1. On the other hand, considering Composition 4 and Composition 5 based on Si-Rubber 2 maximum scratch performance is reached at a high content of Silicone rubber base, while mechanical performance and hardness are lowered due to the increase of Silicone rubber base content. Composition 4 is an example of a thermoplastic elastomer which is particularly suitable for forming wearable items such as watch bracelets.

Compositions 1 to 5 described above were tested by capillary viscosity testing to evaluate the processing abilities of each compositions. Capillary viscosity testing allows determining shear viscosity in defined shear conditions at a given temperature. The range of shear rate applied is representative of standard transformation process. Results are summarized in Table 2 below. Composition 3 using Si-Rubber 1 at 25% in the composition combines the best scratch performance and the lower viscosity making it particularly suitable for large part moulding or thin wall moulding operations.

TABLE 2

|  |  |  | Reference 1 | Composition 2 | Composition 3 | Composition 4 | Composition 5 |
|---|---|---|---|---|---|---|---|
| Formulation | Si-Rubber 1 | | 43.33 | 38.71 | 24.2 | | |
| | Si Rubber 2 | | | | | 38.71 | 24.2 |
| | Si-Fluid | | 0.54 | 0.34 | 0.022 | 0.34 | 0.022 |
| | TPU1 | | 31 | | | | |
| | TPU2 | | 19 | | | | |
| | TPU3 | | | 55.85 | 70.85 | 55.85 | 70.85 |
| | XL | | 1.27 | 0.9 | 0.56 | 0.9 | 0.56 |
| | Cat. | | 0.06 | 0.04 | 0.02 | 0.04 | 0.02 |
| | AO | | 0.15 | 0.15 | 0.15 | 0.15 | 0.15 |
| | Additives | | 0.65 | | | | |
| | Black-MB | | 4 | 4 | 4 | 4 | 4 |
| | | Unit | | | | | |
| Properties | Viscosity at 200° C. Shear - 25 cm−1 | Pa · s | 2409 | 2460 | 920 | 1839 | 852 |
| | Viscosity at 200° C. Shear - 50 cm−1 | Pa · s | 1565 | 1617 | 736 | 1261 | 671 |
| | Viscosity at 200° C. Shear - 100 cm−1 | Pa · s | 1063 | 1123 | 621 | 921 | 559 |
| | Viscosity 200° C. at Shear - 250 cm−1 | Pa · s | 642 | 678 | 433 | 587 | 398 |

TABLE 2-continued

| | | | | | | |
|---|---|---|---|---|---|---|
| Viscosity at 200° C. Shear - 500 cm−1 | Pa · s | 437 | 472 | 340 | 410 | 307 |
| Viscosity at 200° C. Shear - 1000 cm−1 | Pa · s | 288 | 317 | 254 | 280 | 226 |
| Viscosity at 200° C. Shear - 2500 cm−1 | Pa · s | 163 | 183 | 154 | 158 | 135 |
| Viscosity at 200° C. Shear - 5000 cm−1 | Pa · s | 102 | 114 | 99 | 97 | 85 |
| Erichsen scratch test (6N; 0.5 mm ball shape; 80 × 0.5 lines) | % | 65 | 70 | 80 | 85 | 75 |

The test composition in this section slightly differs from the previous one by the chemical composition of thermoplastic polyurethanes used. Purpose of this section is to demonstrate the advantages of thermoplastic silicone composition of the invention in standard stain resistance testing over existing solutions recommended for all coloured use including pure silicone composition. Materials used in the following Examples were Si-Rubber 1: Uncatalysed Silicone Rubber Base comprising a vinyl-terminated diorganopolysilxane gum of 70 Shore A hardness with a silica content of 35%

Si-Rubber 2: Uncatalysed Silicone Rubber comprising a vinyl-terminated diorganopolysiloxane gum of 40 Shore A hardness with a silica content of 21%

Si-Rubber 3—PART A: A 0.005% in weight platinum complex catalysed Silicone Rubber Base comprising a vinyl-terminated liquid diorganopolysiloxane gum of 70 Shore A hardness with a silica content of 32%

Si-Rubber 3—PART B: A 5% in weight Dimethyl, Methylhydrogen Siloxane, copolymer containing Silicone Rubber Base comprising 5% in weight Dimethyl, Methylhydrogen Siloxane copolymer and a vinyl-terminated liquid diorganopolysiloxane gum of 70 Shore A hardness with a silica content of 32%

Si-Fluid is a polydimethylsiloxane fluid

Catalyst: Dow corning 'Syl-Off 4000' Platinum Catalyst having a Pt content of 0.40%.

XL: Dimethyl, Methylhydrogen Siloxane, copolymer, Trimethylsiloxy-terminated of Si-bonded hydrogen content 1.6%

TPU4: Lubrysol-Merquinsa PEARLTHANE 91T85, thermoplastic polyurethane

TPU5: Bayer DESMOPAN DP 85092A, thermoplastic polyurethane

TPU6: Bayer DESMOPAN DP 85085A thermoplastic polyurethane

TPU7: BASF ELASTOLLAN LP 9277, thermoplastic polyurethane

Copolymer1: OMNOVA SOLUTIONS SUNIGUM P95, Acrylonitrile-butyl acrylate-methyl methacrylate-styrene copolymer Copolymer2: KURARAY KURAMIRON TU-S5265, a copolymer of Hydrogenated Styrene-diene Polymer, Butanediol-diisocyanatodiphenylmethane copolymer and hydroxy-terminated hydrogenated butadiene-isoprene-styrene polymer Elastomer1: KRATON POLYMERS KRATON G1654, styrene-ethylene, butylene-styrene block copolymer Elastomer2: KRATON POLYMERS KRATON G1651, styrene-ethylene, butylene-styrene block copolymer Elastomer3: Kuraray HYBRAR 5127, insaturated styrene isoprene styrene block copolymer Plasticizer: Usoco PRIMOL 352, 70 cst mineral oil Filler: OMYA OMYACARB 5 AV, calcium carbonate mineral filer AO: BASF Irganox 1010, tetrakis(methylene(3,5-di-tert-butyl-4-hydroxy-hydrociannate)methane Additive: CRODA Crodamide-EBS, Ethylbutylstearamide surface lubricating additive.

For thermoplastic elastomers were prepared by the process of the invention. The mixing of components and vulcanisation was carried out using a twin screw extruder, 25 mm of diameter and 48 L/D. The processing section was heated in a range from 180° C. up to 220° C. the screw speed was 200 rpm and the throughput rate was 15 kg/hour. Si-Rubber 1 or 2 was added to organic thermoplastic preblend (TPU) within the two first sections of the extruder. The organohydridopolysiloxane XL is added into the blend to achieve a good dispersion of these two silicone components in the thermoplastic polyurethane before addition of the catalyst, which initiates the vulcanization of the silicone composition within the polyurethane matrix. Feeding zones for each component are fixed and located within the first half of the twin screw extruder barrel. Specimen of the fifth composition has been directly prepared by injection moulding using adequate equipment which is not referring to the invention discussed here, this fifth composition is used as a pure silicone product reference. The proportions of materials used are shown in Table 3 below.

Test specimens for stain resistance testing were prepared by injection moulding. Heating temperature for injection moulding was set at 180° C. to 220° C. and mold temperature set at 40° C.

Stain resistance measurement relies on a test protocol specifically developed to characterize intrinsic ability of materials to resist to blue jean staining and is intended to mimic day life use of portable/wearable devices rubbed against blue jeans pants and trousers. The stain resistance protocol relies on a quantitative measurement of the aspect change of a moulded specimen caused by repetitive displacements of a piece of blue jeans pants (Levi's 501 Dark Blue Jeans) over the specimen surface. The aspect change is a translation of chromatic aberration measurement (Delta E) before and after the specimen has been exposed to test. For comparison purpose and to increase testing consistency and robustness a Taber industries 5750 linear abraser is used. A sequence of 500 cycles at 60 cycles/min is performed under a constant loading of 5 N. The stain resistance is then estimated thanks to chromatic aberration measurement (Delta E) performed using a Minolta Spectrometer before and after the specimen has been exposed to test. Two comparative test conditions has been applied either with the inside surface of a dry blue jean cut with threads in parallel direction to rubbing or in a wet blue jean test condition using a soaked in water peace of jean's, pat with paper towel, tested with the outside surface. Results in both test conditions are summarized in table 3:

TABLE 3

| | Material description | Composition 6 | Composition 7 | Composition 8 | Composition 9 | Composition 10 Reference |
|---|---|---|---|---|---|---|
| Formulation | Si-Rubber 1 | 20.70% | 20.70% | 20.70% | 37.40% | |
| | Si-Rubber 2 | | | | | |
| | Si-Rubber 3-PART A | | | | | 50.00% |
| | Si-Rubber 3-PART B | | | | | 50.00% |
| | Si-Fluid | 0.26% | 0.26% | 0.26% | 1.35% | |
| | Catalyst | 0.03% | 0.03% | 0.03% | 0.15% | |
| | XL | 0.61% | 0.61% | 0.61% | 1.10% | |
| | TPU 4 | | | | 59.85% | |
| | TPU 5 | 42.60% | | | | |
| | TPU 6 | | 41.20% | | | |
| | TPU 7 | | | 29.95% | | |
| | Copolymer 1 | | | 10.80% | | |
| | Copolymer 2 | 9.60% | 9.80% | | | |
| | Elastomer 1 | 7.70% | 9.15% | | | |
| | Elastomer 2 | 4.15% | 3.90% | | | |
| | Elastomer 3 | | | 31.80% | | |
| | Plasticizer | 8.50% | 8.50% | | | |
| | Filler | 5.40% | 5.40% | 5.40% | | |
| | AO | 0.15% | 0.15% | 0.15% | 0.15% | |
| | Additive | 0.30% | 0.30% | 0.30% | | |
| Stain resistance | Delta E (dry jeans) | 1.47 | 2.84 | 0.87 | 0.68 | 1.25 |
| | Delta E (wet jeans) | 2.96 | 4.11 | 3.20 | 1.77 | 0.98 |

The invention claimed is:

1. A thermoplastic elastomer composition comprising a blend of:
    (A) a thermoplastic organic polymer comprising a urethane polymer; and
    (B) a silicone composition comprising:
        (B1) a silicone base comprising;
            (B1a) a diorganopolysiloxane gum having an average of at least 2 alkenyl groups per molecule, and
            (B1b) from 1 to 50% by weight based on the diorganopolysiloxane gum (B1a) of a reinforcing filler; and
        (B2) an organohydrido silicone compound which contains an average of at least 2 silicon-bonded hydrogen groups per molecule;
    wherein the weight ratio of the thermoplastic organic polymer (A) to the silicone composition (B) is in the range of from 55:45 to 80:20.

2. The thermoplastic elastomer composition according to claim 1, wherein the reinforcing filler (B1b) is silica.

3. The thermoplastic elastomer composition according to claim 2, wherein the silica reinforcing filler (B1b) is present at from 2 to 10% by weight based on the diorganopolysiloxane gum (B1a) and the weight ratio of the thermoplastic urethane polymer (A) to the silicone composition (B) is in the range of 55:45 to 65:35.

4. The thermoplastic elastomer composition according to claim 2, wherein the silica reinforcing filler (B1b) is present at from 6 to 20% by weight based on the diorganopolysiloxane gum (B1a) and the weight ratio of the thermoplastic urethane polymer (A) to the silicone composition (B) is in the range of 65:35 to 80:20.

5. The thermoplastic elastomer composition according to claim 1, wherein the thermoplastic organic polymer (A) comprises 50 to 100% by weight thermoplastic polyurethane, 0 to 50% by weight of a styrene-based non-crosslinked elastomer, and 0 to 20% of an acrylic styrene copolymer.

6. The thermoplastic elastomer composition according to claim 1, further comprising (C) a hydrosilylation catalyst.

7. A process for forming a vulcanised thermoplastic elastomer comprising vulcanizing the thermoplastic elastomer composition of claim 6 to obtain the vulcanized thermoplastic elastomer.

8. The process according to claim 7, wherein the thermoplastic organic polymer (A), the silicone base (B1), the organohydrido silicone compound (B2) and the hydrosilylation catalyst (C) are contacted at a temperature in the range of 100° C. to 250° C.

9. The process according to claim 7, wherein the thermoplastic organic polymer (A), the silicone base (B1), the organohydrido silicone compound (B2) and the hydrosilylation catalyst (C) are blended in an extruder.

* * * * *